(12) United States Patent
Morel

(10) Patent No.: US 7,719,168 B2
(45) Date of Patent: May 18, 2010

(54) BRAKING DEVICE FOR AN ELECTRIC MOTOR

(75) Inventor: Jean-Pierre Morel, Les Fourgs (FR)

(73) Assignee: ETEL S.A., Motiers, Swiss Confederation ( * ) Notice: Subject to any disclaimer, the term of this patent is extended or adjusted under 35 U.S.C. 154(b) by 275 days.

(21) Appl. No.: 11/996,857

(22) PCT Filed: May 19, 2006

(86) PCT No.: PCT/EP2006/004763

§ 371 (c)(1),
(2), (4) Date: Feb. 8, 2008

(87) PCT Pub. No.: WO2007/012359

PCT Pub. Date: Feb. 1, 2007

(65) Prior Publication Data

US 2008/0224548 A1    Sep. 18, 2008

(30) Foreign Application Priority Data

Jul. 28, 2005   (CH) ..................... 1262/05

(51) Int. Cl.
*H01L 41/08*   (2006.01)

(52) U.S. Cl. .................................... 310/328
(58) Field of Classification Search ............. 310/311, 310/328

See application file for complete search history.

(56) References Cited

U.S. PATENT DOCUMENTS

| | | | |
|---|---|---|---|
| 5,039,900 A * | 8/1991 | Nashiki et al. ............ 310/328 |
| 2006/0125350 A1 * | 6/2006 | Audren et al. ............ 310/328 |
| 2007/0090610 A1 | 4/2007 | Hoffmann | |

FOREIGN PATENT DOCUMENTS

| | | |
|---|---|---|
| DE | 100 22 759 | 11/2001 |
| EP | 0 936 366 | 8/1999 |
| JP | 60-204272 | * 10/1985 |
| JP | 60-213275 | * 10/1985 |
| WO | WO 2005/015047 | 2/2005 |

OTHER PUBLICATIONS

International Search Report, PCT International Patent Application No. PCT/EP2006/004763, dated Sep. 20, 2006.

\* cited by examiner

*Primary Examiner*—Thomas M Dougherty
(74) *Attorney, Agent, or Firm*—Kenyon & Kenyon LLP

(57) ABSTRACT

A braking device for an electric motor includes two brake pads, which are connected to brake disks, which cooperate with a brake rail. The two brake pads are rigidly connected by a connecting element, which is able to experience a certain deflection under the influence of a piezoelectric element, which is used to distance the two brake pads from each other. An assembly, which includes the two brake pads and their connecting element, is fastened on a support by a fastening device, which is elastically deformable along the direction at right angles with respect to the brake rail and to the two brake pads. The elastically deformable fastening device is formed of plates, which are connected on one end to the assembly and on the other end to the support.

16 Claims, 3 Drawing Sheets

BRAKING DEVICE FOR AN ELECTRIC MOTOR

FIELD OF THE INVENTION

The present invention relates to a braking device for an electric motor, e.g., a linear motor, of the type having two brake pads that cooperate with a brake rail that is inserted between these two brake pads. Braking is achieved by brake disks, which are connected with the two brake pads, laterally pressing against a brake rail or brake disk. In order to operate the braking device, i.e., in order to activate or release the brake, the braking device includes a distancing device connected to the two brake pads and that make it possible to change the clearance between these two brake pads in order activate or deactivate the braking device.

BACKGROUND INFORMATION

Certain braking devices having two brake pads, which cooperate with a brake rail or in a similar manner with a brake plate or brake disk, are conventional. For numerous applications, it is necessary to maintain a precise position of the movable part of an electric motor when stopping; that is, not only in the longitudinal direction of the brake rail, but also in the lateral directions, i.e., along the three main axes.

Most conventional braking devices of the type having brake pads have a main problem of changing the position of the movable part when operating the braking device. The device for distancing the two brake pads may produce deformations, in particular on the material that connects these two brake pads, these deformations consequently acting on the support of the assembly, which is formed by the two brake pads and the distancing device, on which support this assembly is rigidly fastened. Consequently, the change of the mechanical stresses in the braking device in its operation has the result of allowing the movable part of the motor, which is rigidly connected to the support, to move, in particular when activating the brake, in order to keep the movable part in a given position. In the case in which the two brake pads are rigidly connected by a connecting element that may experience a certain deflection, but which has the required stiffness when a braking force is exerted against the lateral walls of the brake rail, the change of the clearance of the two brake pads produces a deformation of this connecting element along the Z-axis (located in the center plane with respect to the two brake pads and perpendicularly with respect to the longitudinal direction of the brake rail). This deformation of the connecting element produces a change of position along the Z-axis of the support on which the connecting element is generally rigidly fastened.

Another problem encountered in braking devices of this kind results from the fact that the brake rail or the guide system of the movable part (which may be formed by the brake rail) is not always entirely straight. In such a case, it is possible that the brake disks, which are mounted on the brake pads, cause friction on the rail. The rigid construction of the conventional braking devices produces a significant braking effect at such frictions, which is unfavorable for the dynamic behavior of the electric motor.

SUMMARY

Example embodiments of the present invention avoid the above-mentioned disadvantages by providing a braking device of the type having brake pads, which cooperate with a brake rail or brake disk, and which braking device makes it possible to maintain precisely the position of the movable part along the three main axes when operating this braking device.

In addition, example embodiments of the present invention provide a braking device of the kind described above, which is characterized in that the assembly formed by the two brake pads and the distancing device is fastened on a support of this braking device by a fastening device, which is elastically deformable relative to this support along a direction at right angles to the brake rail.

Since the brake pads connected to the distancing device are mounted on the support of the braking device with the aid of an elastically deformable fastening device, the deformations experienced by the assembly including the brake pads are no longer transmitted to the support such that the movable element remains in a stable position when the braking device is operated. In addition, the elastically deformable fastening device allows for the parasitic braking due to the friction of the brake disks on the brake rail to be greatly reduced when the latter and/or the guide device is/are not entirely straight. The two brake pads and their connecting element may experience a lateral displacement under the influence of a relatively small force such that the pressure that is exerted on the one or the other of the disks connected to the brake pads when the brake is released remains relatively low.

In the example embodiment described below, the distancing device of the brake pads is formed by a piezoelectric element that is situated between these two brake pads. In the example embodiment, the elastically deformable fastening device includes at least two plates that have a certain elasticity along a direction at right angles with respect to the brake rail, but that have a good stiffness along the direction parallel to this brake rail. This latter feature guarantees a precise and stable positioning along the displacement direction of the movable part of the electric motor and a stable maintenance of the given position of this movable part when stopping when operating the braking device for activating the brake. The elastic plates are dimensioned such that they absorb the mechanical stresses and deformations of the two brake pads and of the material elements connecting the latter.

According to an example embodiment of the present invention, a braking device for an electric motor includes: at least two brake pads adapted to cooperate with at least one of (a) a brake rail and (b) a brake disk arranged between the brake pads, the brake pads adapted to press the at least one of (a) the brake rail and (b) the brake disk laterally to brake a movable part of the electric motor; a distancing device, the brake pads connected to the distancing device, the distancing device configured to change a clearance between the brake pads to activate and deactivate the braking device; a support; and a fastening device, an assembly of the brake pads and the distancing device fastened on the support by the fastening device. The fastening device is elastically deformable relative to the support along at least one direction at a right angle with respect to a longitudinal direction of the at least one of (a) the brake rail and (b) the brake disk.

According to an example embodiment of the present invention, an electric motor includes: at least one of (a) a brake rail and (b) a brake disk connected to a movable part of the electric motor; and a brake device, such as that described above.

According to an example embodiment of the present invention, a braking device for an electric motor includes: at least two brake pads for cooperating with at least one of (a) a brake rail and (b) a brake disk arranged between the brake pads, the brake pads pressing the at least one of (a) the brake rail and (b) the brake disk laterally for braking a movable part of the electric motor; distancing means, the brake pads connected to the distancing means, the distancing means for changing a clearance between the brake pads for activating and deactivating the braking device; a support; and fastening means, an assembly of the brake pads and the distancing means fastened on the support by the fastening means. The fastening means are elastically deformable relative to the support along at least one direction at a right angle with respect to a longitudinal direction of the at least one of (a) the brake rail and (b) the brake disk.

Additional features and advantages of the braking device according to example embodiments of the present invention are described in more detail in the following description, which is provided with reference to the drawing, which is by no means limiting example.

DETAILED DESCRIPTION

A braking device according to an example embodiment of the present invention is described below with reference to the Figures.

Figure 1:
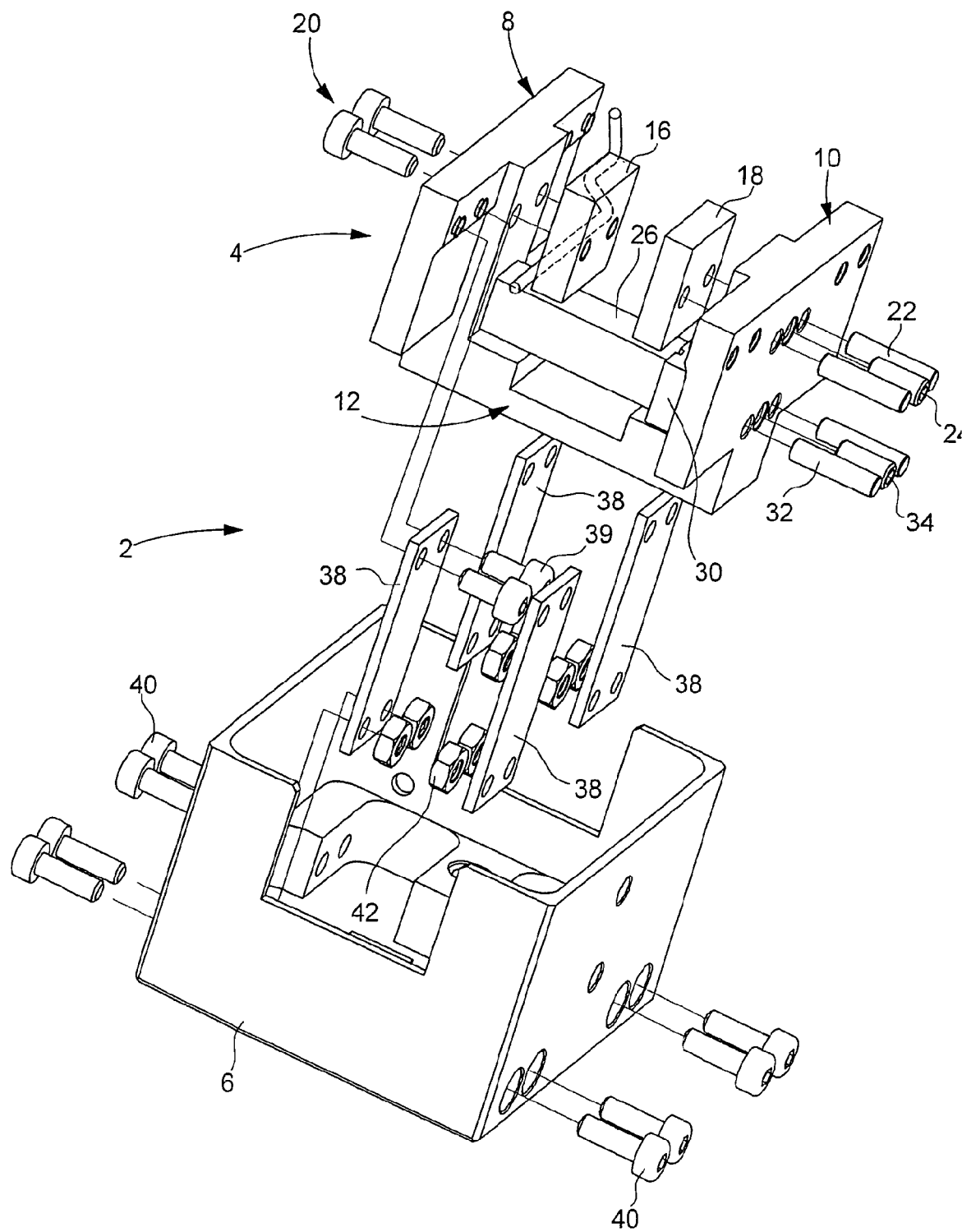
FIG. 1 is a perspective and exploded view of a braking device according to an example embodiment of the present invention.
Figure 2:
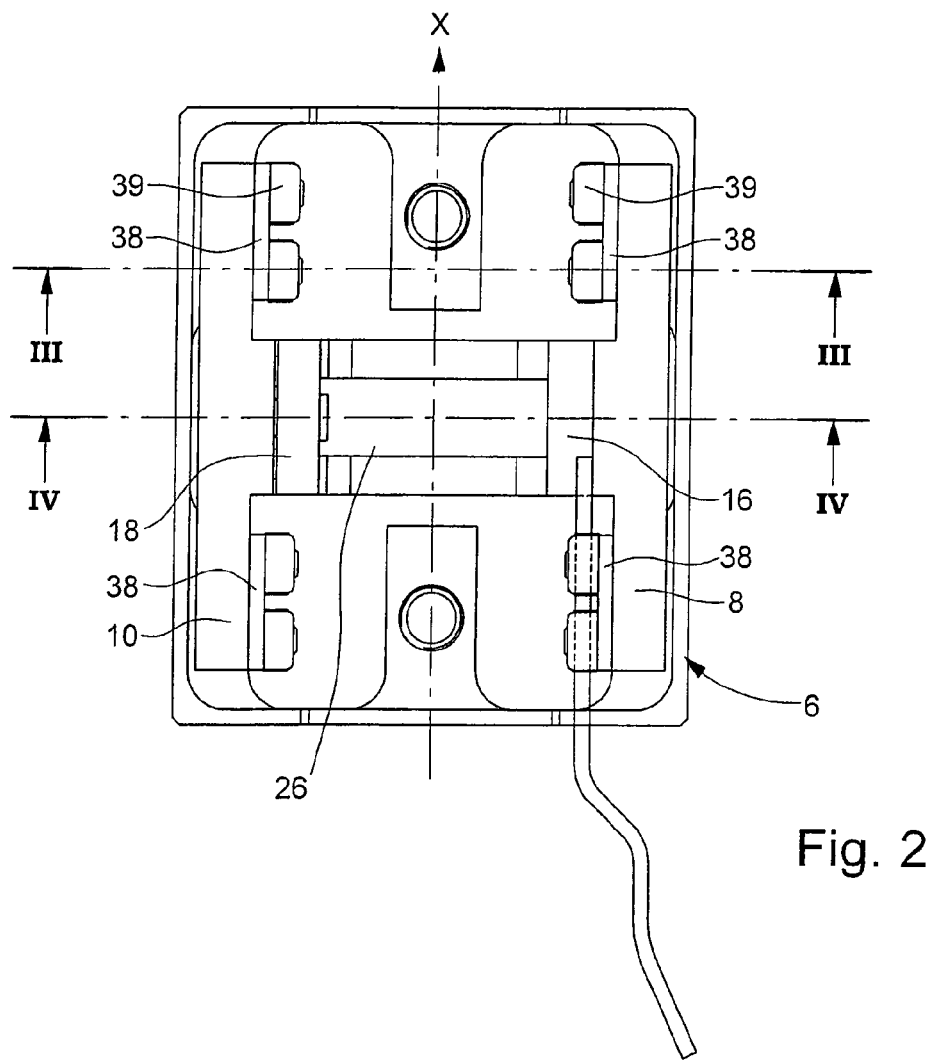
FIG. 2 is a top view of the device shown in FIG. 1.
Figure 3:
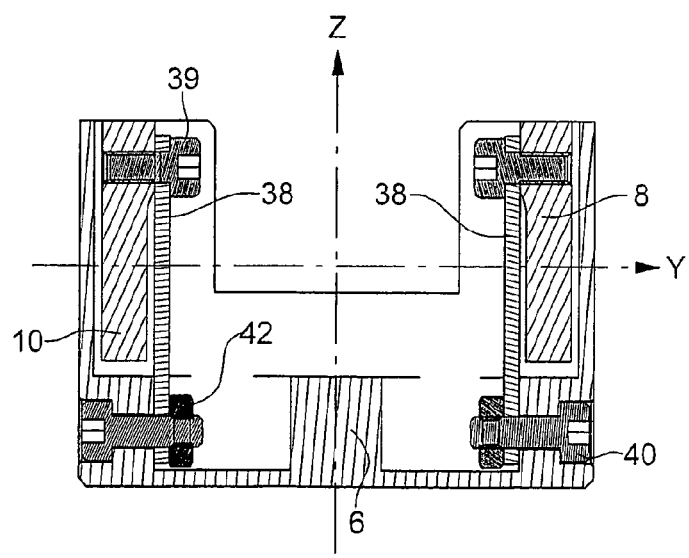
FIG. 3 is a cross-sectional view taken along the line III-III of FIG. 2.
Figure 4:
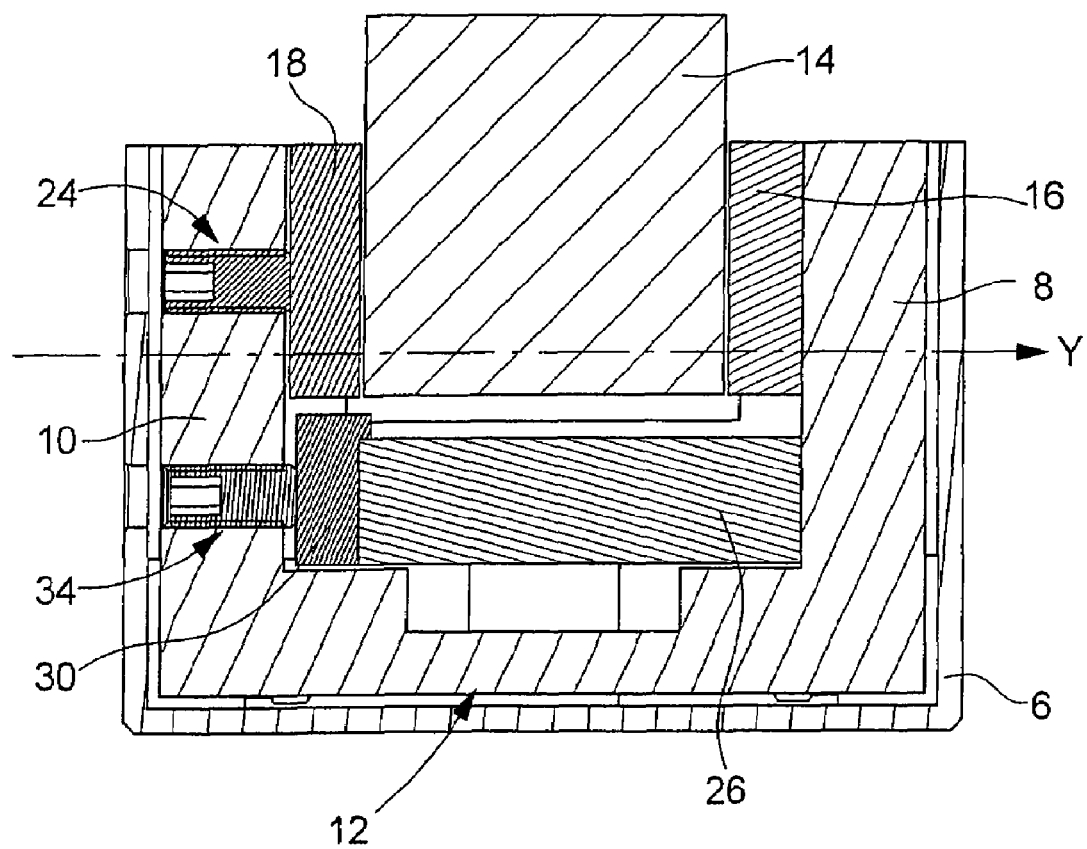
FIG. 4 is a cross-sectional view taken along the line IV-IV of FIG. 2.

Braking device 2 includes a first assembly 4 and a support 6 that forms a housing. Assembly 4 includes two brake pads 8 and 10, which are connected by connecting element 12 that extends at right angles with respect to the two brake pads and to guide rail 14, which is shown schematically in FIG. 4. Guide rail 14 defines a brake rail. A brake disk suitable for the braking function may be provided however. In the example embodiment shown, connecting element 12 forms one and the same piece together with the two brake pads. In other example embodiments, however, the brake pads may be connected to each other by different elements that are fastened to the brake pads. Each brake pad is connected to a brake disk 16 or 18. Disk 16 is provided to be fixed and is mounted on brake pad 8 with the aid of two screws 20. Disk 18 is mounted on brake pad 10 with the aid of two pins 22, which are able to glide in the respective holes of brake pad 10 when a certain force is exerted on disk 18. An adjusting screw 24 is provided to set the position of disk 18 relative to disk 16 precisely.

Assembly 4 also includes a piezoelectric element 26, which is connected to connecting element 12 to form a distancing device for brake pads 8 and 10. Piezoelectric element 26 is situated between the two brake pads, its first end abutting on brake pad 8 and its second end abutting on a blocking piece 30, which is mounted on brake pad 10 in a movable manner with the aid of pins 32 that are able to glide in the corresponding holes of this brake pad 10. Blocking piece 30 is held in contact with piezoelectric element 26 with the aid of a blocking screw 34. This screw 34 consequently makes it possible to exert a certain initial pressure on piezoelectric element 26.

The braking device is situated such that brake rail 14 is activated in the absence of a supply of electrical power, the brake being released when the piezoelectric element is supplied with electrical power. When supplying power to the piezoelectric element, the clearance between the two brake pads 8 and 10 or between brake disks 16 and 18 increases. This distancing of the brake pads by the piezoelectric element creates stresses and a certain deformation of the base of the two brake pads and of connecting element 12 connecting the bases of these two brake pads. Connecting element 12 is dimensioned so as to have a sufficient stiffness in order to supply the intended braking force, but not one that is too high to allow for a certain deflection under the distancing force that is exerted by piezoelectric element 26. Thus, it should be understood that connecting element 12 has a variable deflection when the braking device is activated. To prevent this change in the state of deflection of connecting element 12 from being transmitted to the support of the braking device and to the movable part of the electric motor, which is rigidly connected to support 6, assembly 4 is fastened on support 6 by plates 38 that are elastically deformable along the Y-direction, i.e., at right angles with respect to the longitudinal direction of rail 14. Each plate 38 is fastened on a first end on assembly 4 by screws 39 and on its second end on support 6 by screws 40, which are connected to nuts 42. It must be taken into consideration that elastically deformable plates 38 may be fastened on support 6 and on assembly 4, e.g., by any conventional arrangement.

Plates 38 have a certain elasticity along the Y-direction, i.e., along the longitudinal direction of piezoelectric element 26, along which the distancing force of the brake pads is exerted. By contrast, along the X-direction, which corresponds to the longitudinal direction of brake rail 14, these plates 38 are rigid and consequently substantially non-deformable.

Other distancing devices of brake pads 8 and 10 may be provided, e.g., electric, hydraulic or pneumatic device(s). A piezoelectric device, however, is considered to be preferred. For example, the piezoelectric device is compact, consumes little and is stable with regard to temperature.

The deformations experienced by assembly 4 when activating the braking device are absorbed by plates 38 such that support 6 is not exposed to any mechanical stresses that produce deformations or displacements of the support, e.g., along the Z-axis.

One skilled in the art may design different variants for the device for fastening assembly 4, which includes the brake pads, on support 6, which is rigidly connected to the movable part of the electric motor, in that these fastening devices may be situated such that they are elastically deformable along at least one direction at right angles with respect to brake rail 14.

What is claimed is:

1. A braking device for an electric motor, comprising:
at least two brake pads adapted to cooperate with at least one of (a) a brake rail and (b) a brake disk arranged between the brake pads, the brake pads adapted to press the at least one of (a) the brake rail and (b) the brake disk laterally to brake a movable part of the electric motor;
a distancing device, the brake pads connected to the distancing device, the distancing device configured to change a clearance between the brake pads to activate and deactivate the braking device;
a support; and
a fastening device, an assembly of the brake pads and the distancing device fastened on the support by the fastening device;
wherein the fastening device is elastically deformable relative to the support along at least one direction at a right angle with respect to a longitudinal direction of the at least one of (a) the brake rail and (b) the brake disk.

2. The braking device according to claim 1, wherein the distancing device includes a connection device that connects the brake pads and a piezoelectric device arranged between the brake pads, the distancing device activatable along a direction at a right angle with respect to the brake pads, the distancing device adapted to distance the brake pads from each other when the piezoelectric element is supplied with power.

3. The braking device according to claim 1, wherein the fastening device includes plates that are elastically deformable along the direction at a right angle with respect to the longitudinal direction and along a direction at a right angle to the brake pads, the plates rigid along the longitudinal direction.

4. The braking device according to claim 3, wherein the plates include at least one plate corresponding to each brake pad.

5. The braking device according to claim 3, wherein one end of each plate is connected to the assembly and another end of each plate is connected to the support.

6. The braking device according to claim 1, wherein the distancing device includes a piezoelectric device adapted to release the braking device when power is applied to the piezoelectric device.

7. The braking device according to claim 1, wherein the distancing device is configured to change the clearance between the brake pads to activate and deactivate the braking device by deflection of a connection device that connects the brake pads to each other.

8. The braking device according to claim 1, wherein the distancing device is configured to change the clearance between the brake pads to activate and deactivate the braking device by elastic deflection of a connection device that connects the brake pads to each other.

9. The braking device according to claim 7, wherein the connection device extends at a right angle with respect to the brake pads and at a right angle with respect to the at least one of (a) the brake rail and (b) the brake disk.

10. The braking device according to claim 1, further comprising an adjustment device configured to set a relative position between the brake pads.

11. The braking device according to claim 1, wherein the brake pads are connected to respective brake blocks connected together by an elastic connection device.

12. The braking device according to claim 1, wherein the fastening device is substantially non-deformable with respect to the longitudinal direction of the at least one of (a) the brake rail and (b) the brake disk.

13. The braking device according to claim 1, wherein the electric motor is arranged as a linear motor.

14. An electric motor, comprising:
at least one of (a) a brake rail and (b) a brake disk connected to a movable part of the electric motor; and
a brake device including:
 at least two brake pads, the at least one of (a) the brake rail and (b) the brake disk arranged between the brake pads, the brake pads adapted to cooperate with the at least one of (a) the brake rail and (b) the brake disk, the brake pads adapted to press the at least one of (a) the brake rail and (b) the brake disk laterally to brake the movable part of the electric motor;
 a distancing device, the brake pads connected to the distancing device, the distancing device configured to change a clearance between the brake pads to activate and deactivate the braking device;
 a support; and
 a fastening device, an assembly of the brake pads and the distancing device fastened on the support by the fastening device;
wherein the fastening device is elastically deformable relative to the support along at least one direction at a right angle with respect to a longitudinal direction of the at least one of (a) the brake rail and (b) the brake disk.

15. The electric motor according to claim 14, wherein the electric motor is arranged as a linear motor.

16. A braking device for an electric motor, comprising:
at least two brake pads for cooperating with at least one of (a) a brake rail and (b) a brake disk arranged between the brake pads, the brake pads pressing the at least one of (a) the brake rail and (b) the brake disk laterally for braking a movable part of the electric motor;
distancing means, the brake pads connected to the distancing means, the distancing means for changing a clearance between the brake pads for activating and deactivating the braking device;
a support; and
fastening means, an assembly of the brake pads and the distancing means fastened on the support by the fastening means;
wherein the fastening means are elastically deformable relative to the support along at least one direction at a right angle with respect to a longitudinal direction of the at least one of (a) the brake rail and (b) the brake disk.

* * * * *